United States Patent
Ozue et al.

(10) Patent No.: US 7,082,015 B2
(45) Date of Patent: Jul. 25, 2006

(54) ROTARY DRUM AND MAGNETIC REPRODUCING APPARATUS OR MAGNETIC RECORDING AND REPRODUCING APPARATUS USING THE SAME

(75) Inventors: Tadashi Ozue, Kanagawa (JP); Toshio Shirai, Kanagawa (JP)

(73) Assignee: Sony Corporation, Tokyo (JP)

( * ) Notice: Subject to any disclaimer, the term of this patent is extended or adjusted under 35 U.S.C. 154(b) by 187 days.

(21) Appl. No.: 10/271,285

(22) Filed: Oct. 15, 2002

(65) Prior Publication Data

US 2003/0076634 A1    Apr. 24, 2003

(30) Foreign Application Priority Data

Oct. 16, 2001    (JP)    .................... P2001-317993

(51) Int. Cl.
*G11B 5/52*    (2006.01)

(52) U.S. Cl. .................................. 360/271.5

(58) Field of Classification Search ............. 360/271.5, 360/63, 64, 68, 271.3, 275.1
See application file for complete search history.

(56) References Cited

U.S. PATENT DOCUMENTS

| | | | | |
|---|---|---|---|---|
| 4,860,132 A | * | 8/1989 | Lorteije | 360/84 |
| 5,453,892 A | * | 9/1995 | Hasegawa et al. | 360/271.3 |
| 5,684,649 A | * | 11/1997 | Ozue | 360/64 |
| 6,014,286 A | * | 1/2000 | Tsutaki et al. | 360/84 |
| 6,141,166 A | * | 10/2000 | Ozue | 360/64 |
| 6,263,151 B1 | * | 7/2001 | Nishijima et al. | 386/68 |
| 6,278,569 B1 | * | 8/2001 | Fukuda | 360/64 |
| 6,542,322 B1 | * | 4/2003 | Maemine | 360/64 |

* cited by examiner

*Primary Examiner*—Tianjie Chen
(74) *Attorney, Agent, or Firm*—Sonnenschein Nath & Rosenthal LLP

(57) ABSTRACT

A rotary drum includes a plurality of reproducing heads each having a plus azimuth angle (+azimuth angle), which heads are collectively arranged at a location in the circumferential direction of the rotary drum in such a manner as to be in close proximity to each other, to be taken as a +azimuth reproducing head group, and a plurality of reproducing heads each having a minus azimuth angle (−azimuth angle), which heads are collectively arranged at a location in the circumferential direction of the rotary drum in such a manner as to be in close proximity to each other, to be taken as a −azimuth reproducing head group, wherein the +azimuth reproducing head group and the −azimuth reproducing head group are spaced from each other in the circumferential direction of the rotary drum. With this rotary drum, signals can be certainly reproduced from recording tracks with narrowed widths by using the multiple reproducing heads arranged on the rotary drum.

6 Claims, 4 Drawing Sheets

ROTARY DRUM AND MAGNETIC REPRODUCING APPARATUS OR MAGNETIC RECORDING AND REPRODUCING APPARATUS USING THE SAME

BACKGROUND OF THE INVENTION

The present invention relates to a rotary drum and a magnetic reproducing apparatus or a magnetic recording and reproducing apparatus using the rotary drum. In particular, the present invention relates to a technique enabling reproduction of signals from recording tracks of a type allowing higher recording density by multiple channels and narrower widths.

To achieve higher recording densities of magnetic recording media, it is effective to make track widths thereof narrower. As a method of reproducing signals from such a recording medium having narrow tracks, there is known a so-called non-tracking method. The non-tracking method is classified into a type of reproducing signals from recording tracks recorded by a so-called azimuth recording manner, and a type of reproducing signals from recording tracks recorded by a so-called non-azimuth recording manner.

FIG. 4 shows a positional relationship between reproducing heads of a related art rotary drum and recording tracks.

As shown in FIG. 4, according to the azimuth recording manner, recording tracks Tr+, Tr−, . . . can be formed on a magnetic recording medium "a" in such a manner as to be adjacent to each other. As a result, it is possible to realize two-channel magnetic recording mode and hence to further enhance the recording density.

The non-tracking method for reproducing signals from the recording track Tr+, Tr−, . . . recorded by the azimuth recording manner is carried by using a pair of reproducing heads R+1 and R+2 having the same azimuth angle and a pair of reproducing heads R−1 and R−2 having the same azimuth angle, each of which has a width wider than that of each recording track. According to this non-tracking method, even if the scanning loci of the reproducing heads R+1 and R+2 are fluctuated with respect to the +azimuth recording tracks Tr+, . . . either of the reproducing heads R+1 and R+2 is able to keep the on-track state as shown in FIG. 4 and hence to scan the recording track Tr+. At this time, the other one of the reproducing heads R+1 and R+2, which is on the off-track state, scans the −azimuth recording track Tr−; however, since the azimuth angle of the recording head is different from that of the recording track, there does not occur any crosstalk therebetween.

FIG. 5 is a schematic plan view of the related art rotary drum shown in FIG. 4.

As shown in FIG. 5, the +azimuth reproducing heads R+1 and R+2 and the −azimuth reproducing heads R−1 and R−2 are alternately arranged in the circumferential direction of a rotary drum "b" in such a manner as to be spaced from each other at equal intervals of 90°.

By the way, to enhance the density of magnetic recording, there has been a strong demand to make the recording track Tr narrower. For example, the track width Trw of the recording track Tr, which was generally of the order of 10 to 20 μm, has come to be made significantly narrow, and in recent years, the recording track Tr having the track width Trw of 1 to several μm has been put on practical use.

A rotary drum generally causes a "run-out" phenomenon (sometimes, called "fluctuation"), which leads to the fluctuation of the reproducing head R. The run-out includes RRO (Repeatable Run Out) and NRRO (Non Repeatable Run Out).

It is known that the RRO component is of the order of 2 to 4 μm as a critical value for a rotary drum using a ball bearing, and is of the order of 1 to 2 μm as a critical value for a rotary drum using a fluid bearing, and that the NRRO component is of the order of 0.2 to 0.4 μm.

For example, in the case of reproduction via a rotary drum using a ball bearing, the center value of scanning of a reproducing head of the rotary drum is fluctuated within a range of 2 μm because of the RRO component. This means that the locus of the reproducing head on a recording track Tr is fluctuated within a range of 2 μm with respect to the recording track Tr.

For a conventional type recording track Tr having a track width Trw=10 μm or more and a track pitch Trp=10 μm or more, even if the locus of a reproducing head is fluctuated within a fluctuation width of 2 μm, the reproducing head is able to scan the width, which is 8 μm at minimum, of the recording track Tr, and hence to sufficiently obtain reproduction signals.

The width of a recording track, however, has become narrower from the order of 10 to 20 μm to the order of 1 to several μm as described above, and the above-described non-tracking method fails to sufficiently obtain reproduction signals from such a very narrow recording track. For example, in the case of reproducing signals from a recording track Tr having a track width Trw=3 μm and a track pitch Trp=3 μm, if an RRO component of 2 μm occurs for a rotary drum, a reproducing head arranged on the rotary drum can scan only a width, which is 1 μm at minimum, of the recording track Tr, thereby failing to sufficiently obtain reproducing signals therefrom.

SUMMARY OF THE INVENTION

An object of the present invention is to provide a rotary drum capable of reproducing signals from recording tracks with narrowed widths by using multiple reproducing heads, and to provide a magnetic reproducing apparatus or a magnetic recording and reproducing apparatus using the rotary drum.

To achieve the above object, according to a first aspect of the present invention, there is provided a rotary drum including: a plurality of reproducing heads each having a plus azimuth angle (+azimuth angle), which heads are collectively arranged at a location in the circumferential direction of the rotary drum in such a manner as to be in close proximity to each other, to be taken as a +azimuth reproducing head group; and a plurality of reproducing heads each having a minus azimuth angle (−azimuth angle), which heads are collectively arranged at a location in the circumferential direction of the rotary drum in such a manner as to be in close proximity to each other, to be taken as a −azimuth reproducing head group; wherein the +azimuth reproducing head group and the −azimuth reproducing head group are spaced from each other in the circumferential direction of the rotary drum.

According to a second aspect of the present invention, there is provided a magnetic reproducing apparatus or a magnetic recording and reproducing apparatus including a rotary drum. The rotary drum includes a plurality of reproducing heads each having a plus azimuth angle (+azimuth angle), which heads are collectively arranged at a location in the circumferential direction of the rotary drum in such a manner as to be in close proximity to each other, to be taken as a +azimuth reproducing head group; and a plurality of reproducing heads each having a minus azimuth angle (−azimuth angle), which heads are collectively arranged at a location in the circumferential direction of the rotary drum in such a manner as to be in close proximity to each other, to be taken as a −azimuth reproducing head group; wherein the +azimuth reproducing head group and the −azimuth reproducing head group are spaced from each other in the circumferential direction of the rotary drum.

According to the present invention configured as described above, since each of the azimuth reproducing head group is not affected by an RRO component caused by rotation of the rotary drum, it can scan all of recording tracks. Accordingly, it is possible to reproduce signals from the recording tracks by the non-tracking method, and hence to desirably reproduce signals from recording tracks even if the recording tracks are configured as those with multiple channels and narrowed widths.

According to the present invention, preferably, the +azimuth reproducing head group and the −azimuth reproducing head group are spaced at about 180° from each other in the circumferential direction of the rotary drum. With this configuration, since the rotary drum is kept in good balance, the RRP component caused by rotation of the rotary drum can be reduced.

BRIEF DESCRIPTION OF THE DRAWINGS

Other features and advantages of the present invention will be apparent from the following description taken in conjunction with the accompanying drawings wherein.

DETAILED DESCRIPTION OF THE PREFERRED EMBODIMENT

A preferred embodiment of the present invention will be described in detail with reference to the accompanying drawings.

Figure 1:
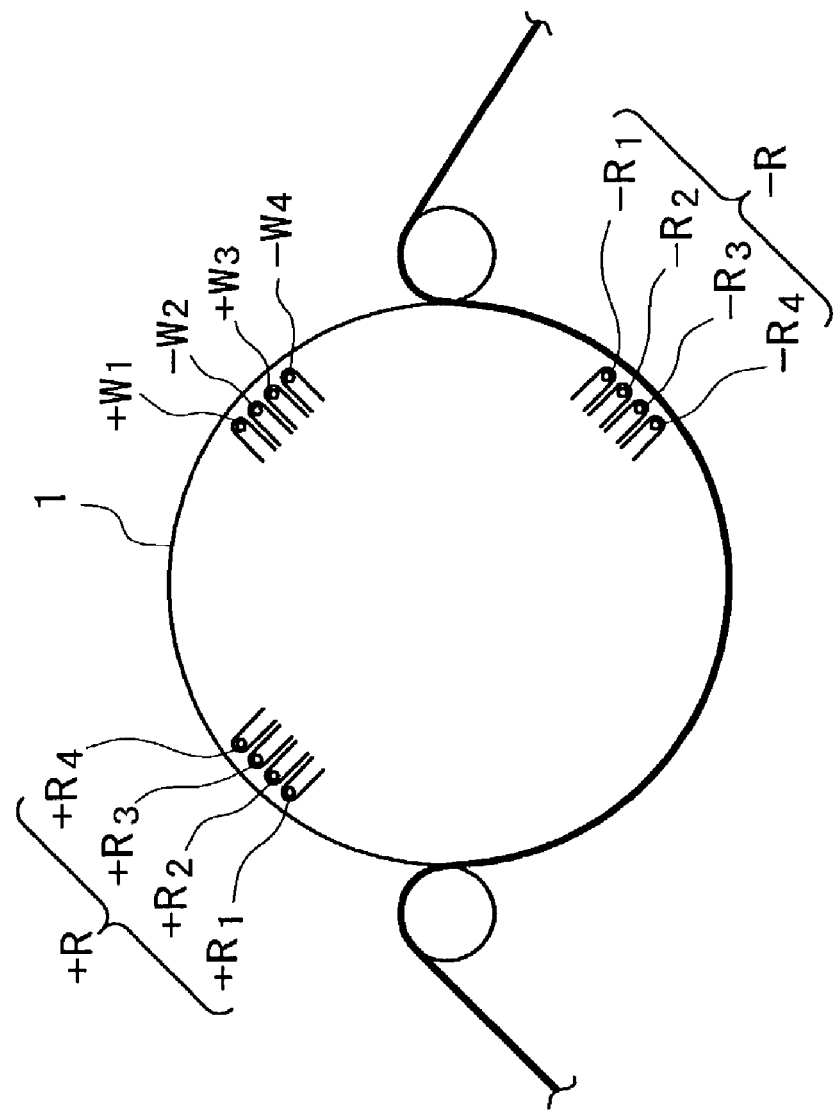
FIG. 1 is a schematic plan view of a rotary drum according to one embodiment of the present invention.
Figure 2:
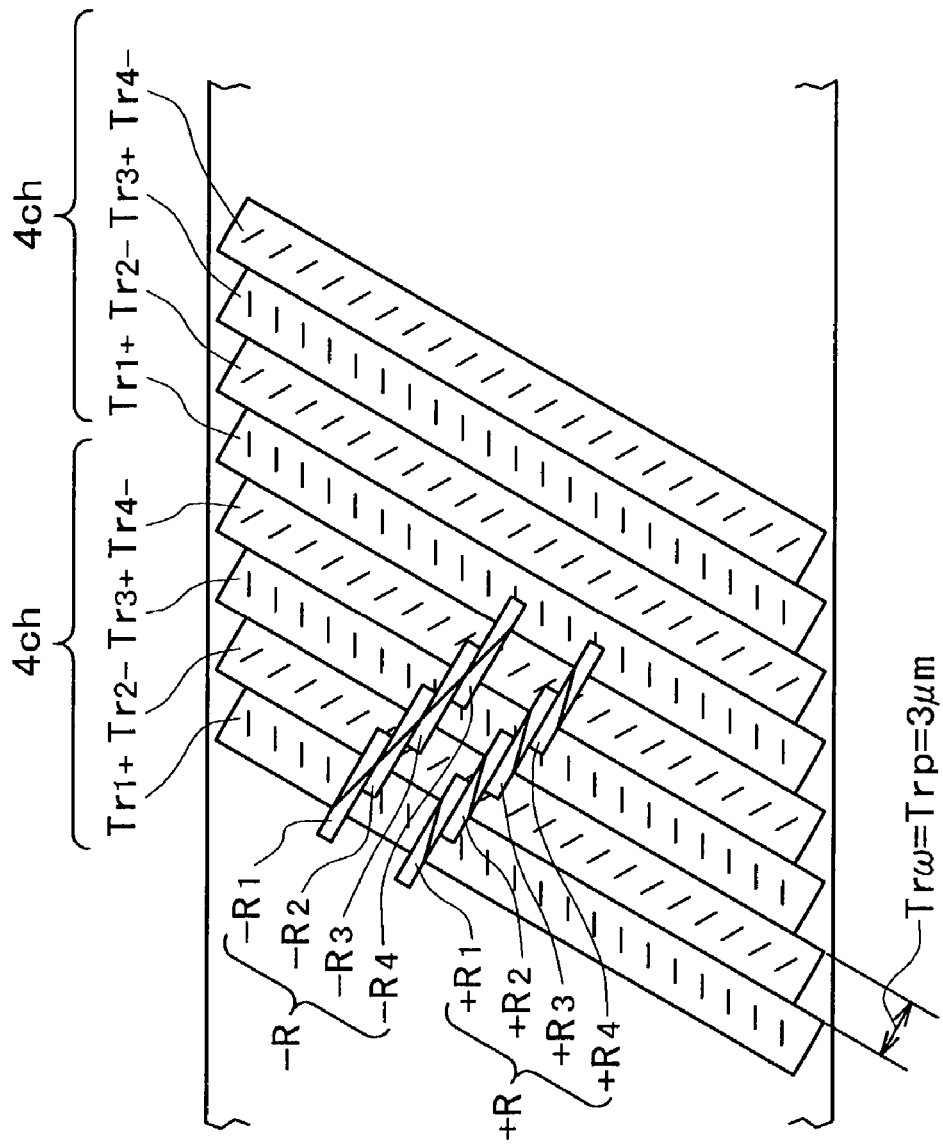
FIG. 2 is a schematic view of the rotary drum shown in FIG. 1, illustrating a positional relationship between recording heads and recording tracks.
Figure 3:
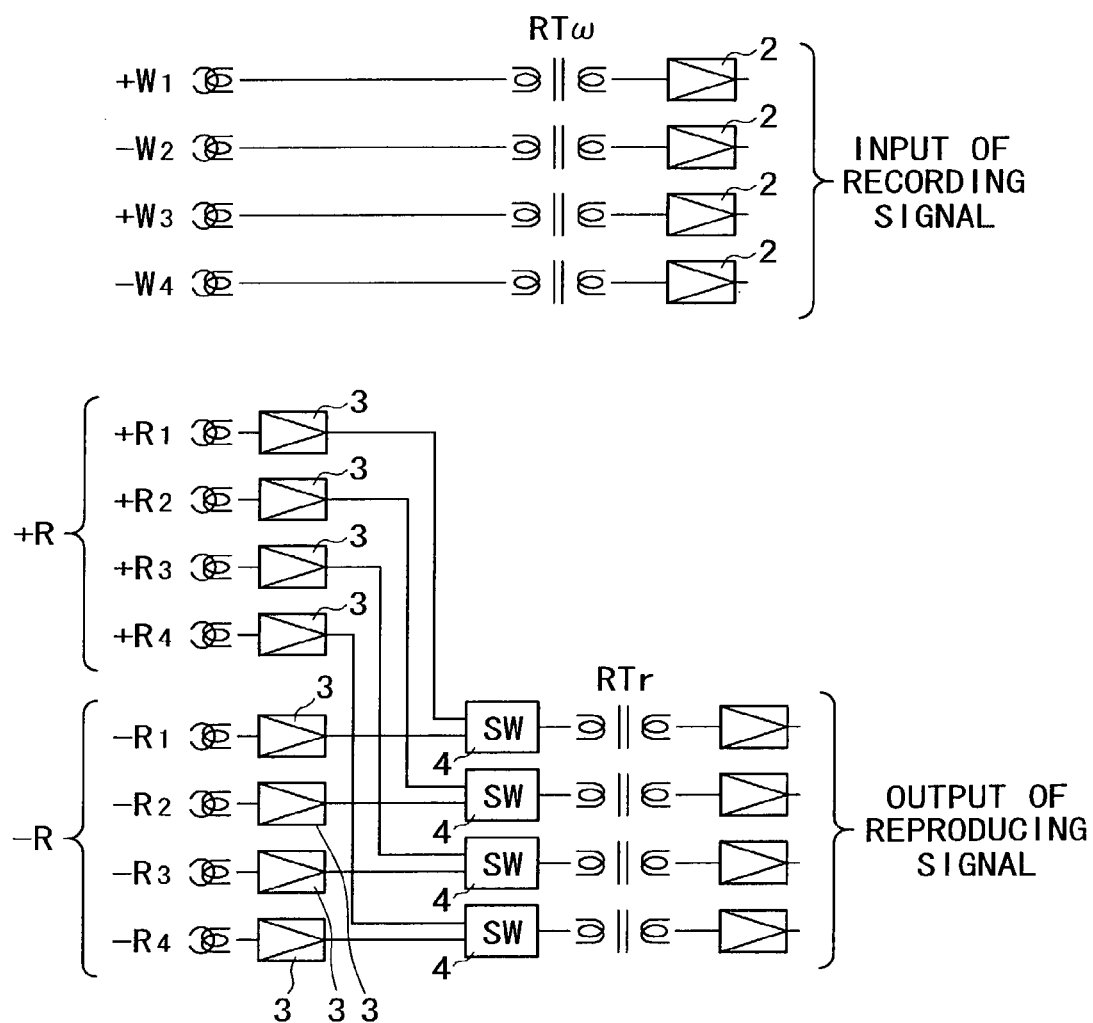
FIG. 3 is a schematic circuit diagram of the rotary drum shown in FIG. 1.
Figure 4:
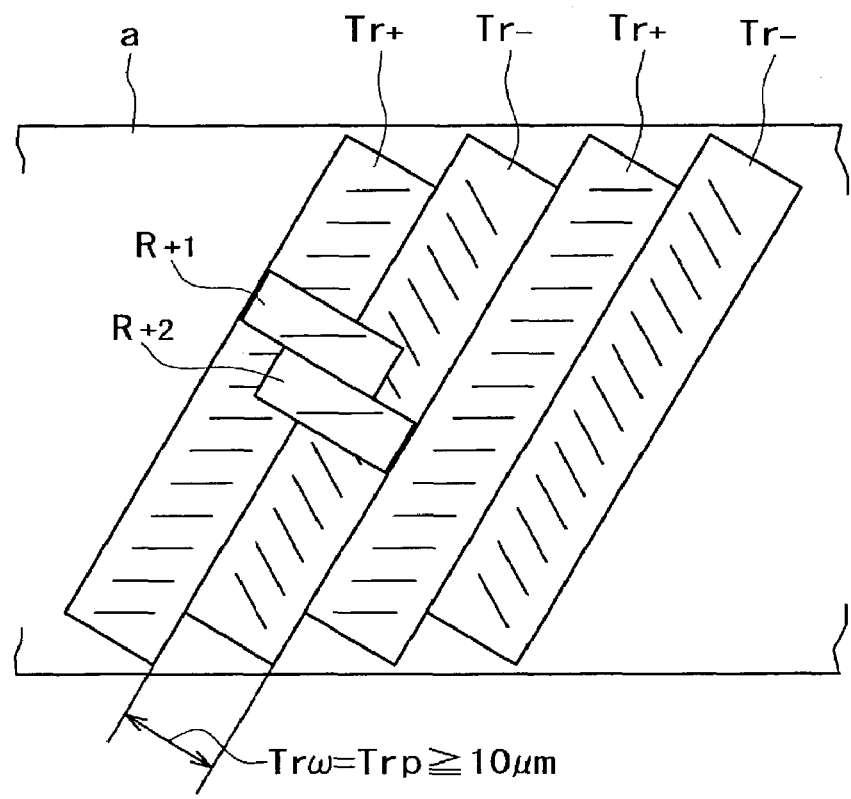
FIG. 4 is a schematic view of a related art rotary drum, illustrating a positional relationship between reproducing heads and recording tracks.
Figure 5:
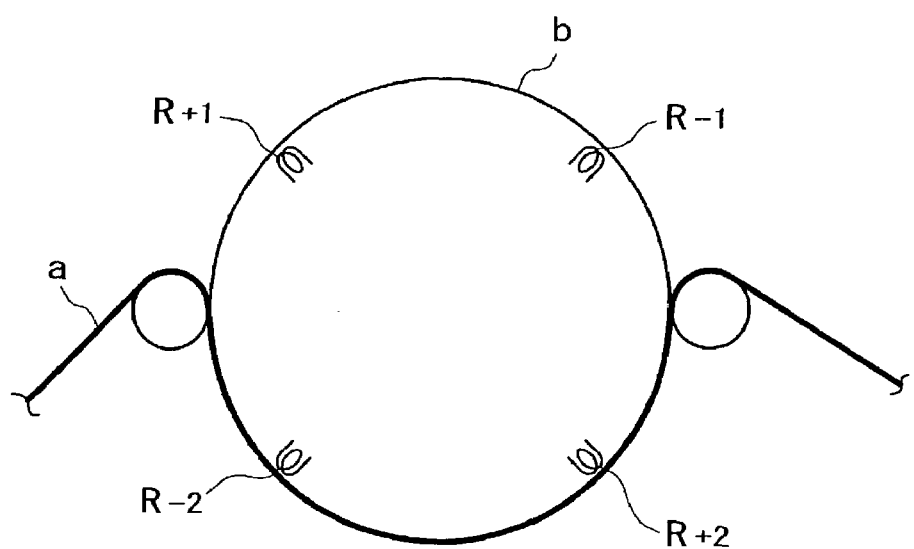
FIG. 5 is a schematic plan view of the rotary drum shown in FIG. 4.

FIGS. 1 to 3 show a preferred embodiment of the present invention.

It is to be noted that description will be made by way of an example of reproducing signals from four-channel recording tracks formed on a magnetic recording medium by the non-tracking method.

Referring to FIG. 1, there is shown a rotary drum 1 in which two recording heads +W1 and +W3, each having a +azimuth angle and two recording heads −W2 and −W4, each having a −azimuth angle, are collectively arranged at a location in the circumferential direction in such a manner as to be close proximity to each other. The four recording heads +W1, −W2, +W3, and −W4 are arranged in this order in the circumferential direction of the rotary drum 1.

The four recording heads +W1, −W2, +W3, and −W4 are arranged on the rotary drum 1 such that the track width Trw and the track pitch Trp of respective recording tracks Tr, Tr, ... become the same value of several μm (for example, 3 μm). It is to be noted that the width of each of the recording heads +W1, −W2, +W3, and −W4 may be set to be equal to the track width Trw, or to be slightly wider than the track width TrW. In the latter case, each of the recording heads +W1, −W2, +W3, and −W4 may form the recording track Tr, Tr, ... in a state that an end portion thereof is overlapped to the adjacent one of the recording heads +W1, −W2, +W3, and −W4.

In the case of forming the recording tracks Tr, Tr, ... by the four recording heads +W1, −W2, +W3, and −W4 arranged at a location in the circumferential direction of the rotary drum 1 in such a manner as to be in proximity to each other, the RRO component of the rotary drum 1 appears as a whole fluctuation of the four recording tracks Tr1+, Tr2−, Tr3+, and Tr4−, but does not appear as any fluctuation between two of the recorded, recording tracks Tr1+, Tr2−, Tr3+, and Tr4−, with a result that the track width TrW and the track pitch Trp of each of the recorded, recording tracks Tr1+, Tr2−, Tr3+, and Tr4− is uniformly formed (see FIG. 2).

The rotary drum 1 further includes, as shown in FIG. 1, four +azimuth reproducing heads +R1, +R2, +R3, and +R4, which are arranged at a location in the circumferential direction of the rotary drum 1 in such a manner as to be in proximity to each other, to be taken as a +azimuth reproducing head group +R, and four −azimuth reproducing heads −R1, −R2, −R3, and −R4, which are arranged at a location in the circumferential direction of the rotary drum 1 in such a manner as to be in proximity to each other, to be taken as a −azimuth reproducing head group −R, wherein the +azimuth reproducing head group +R and the −azimuth reproducing head group −R are spaced at about 180° from each other in the circumferential direction of the rotary drum 1.

The rotary drum 1 is rotated such that the +azimuth reproducing head group +R and the −azimuth reproducing head group −R scan the four recording tracks Tr1+, Tr2−, Tr3+, and Tr4−. Accordingly, as shown in FIG. 2, each of the recording tracks Tr1+, Tr2−, Tr3+, and Tr4− is scanned twice by the corresponding one of the reproducing heads +R1, +R2, +R3, and +R4 and the corresponding one of the reproducing heads −R1, −R2, −R3, and −R4.

For example, the recording track Tr1+ is scanned by the reproducing heads +R1 and −R1. At this time, the reproducing head +R1, which has the azimuth angle being in agreement with that of the recording track Tr1+, can reproduce signals therefrom, but the reproducing head −R1, which has the azimuth angle being not in agreement with that of the recording track Tr1+, cannot reproduce signals therefrom.

In the case of forming the recording tracks Tr, Tr, ... by the recording heads +W1, −W2, +W3, and −W4, as described above, the RRO component of the rotary drum 1 does not appears as any fluctuation between two of the recording tracks Tr, Tr, .... Similarly, in the case of reproducing signals from the recording tracks Tr, Tr, ... by the four reproducing heads +R1, +R2, +R3, and +R4, or the four reproducing heads −R1, −R2, −R3, and −R4, which are arranged at a location in the circumferential direction of the rotary drum 1 in such a manner as to be in proximity to each other, the RRO component of the rotary drum 1 does not appears as any fluctuation between two of the four reproducing heads +R1, +R2, +R3, and +R4, or between two of the four reproducing heads −R1, −R2, −R3, and −R4.

The +azimuth reproducing head group +R composed of the four reproducing heads +R1, +R2, +R3, and +R4, or the −azimuth reproducing head group −R composed of the four reproducing heads −R1, −R2, −R3, and −R4 depicts a scanning locus having the RRO component as a whole; however, since the RRO component of the rotary drum 1 appears in synchronization with one rotation of the rotary drum, the +azimuth reproducing head group +R and the −azimuth reproducing head group −R can scan all of the four channel recording tracks Tr1+, Tr2−, Tr3+, and Tr4− by one rotation or two rotations of the rotary drum 1.

In addition, since the +azimuth reproducing head group +R and the −azimuth reproducing head group −R are spaced at 180° from each other in the circumferential direction, both the reproducing head groups +R and −R do not necessarily depict the same scanning locus because of the effect of the RRP component of the rotary drum 1; however, since there does not occur any fluctuation due to the RRO component between two of the reproducing heads of each of the reproducing head groups +R and −R as described above, each of the reproducing head groups +R and −R can scan all of the four channel recording tracks Tr1+, Tr2−, Tr3+, and Tr4−.

Accordingly, in the case of reproducing signals from the four channel recording tracks Tr1+, Tr2−, Tr3+, and Tr4− by the +azimuth reproducing head group +R composed of the four reproducing heads +R1, +R2, +R3, and +R4, or the −azimuth reproducing head group −R composed of the four reproducing heads −R1, −R2, −R3, and −R4, the +azimuth reproducing head group +R first scans the four channel recording tracks Tr1+, Tr2−, Tr3+, and Tr4−, and after half-rotation of the rotary drum 1, the −azimuth reproducing head group −R scans the same four channel recording tracks Tr1+, Tr2−, Tr3+, and Tr4−.

At the time of scanning the four channel recording tracks Tr1+, Tr2−, Tr3+, and Tr4− by one of the azimuth reproducing head groups +R and −R, even if part of the four channel recording tracks Tr1+, Tr2−, Tr3+, and Tr4− cannot be scanned by the effect of the RRO component, the non-scanned part of the recording tracks Tr1+, Tr2−, Tr3+, and Tr4− can be scanned by next one move rotation of the rotary drum 1. Accordingly, each of the four channel recording tracks Tr1+, Tr2−, Tr3+, and Tr4− can be scanned by the corresponding one (having the same azimuth angle) of the recording heads +R1, +R2, +R3, and +R4 of the +azimuth reproducing head group +R and the recording heads −R1, −R2, −R3, and −R4 of the −azimuth reproducing head group −R.

After each of the four channel recording tracks Tr1+, Tr2−, Tr3+, and Tr4− is thus scanned by the corresponding one of the reproducing heads +R1, +R2, +R3, and +R4 or the reproducing heads −R1, −R2, −R3, and −R4, the reproducing signal obtained by the scanning is inputted in a semiconductor memory, and is converted into required data.

In this way, the non-tracking type reproduction method can be desirably carried out by using the rotary drum according to the present invention.

In addition, according to the rotary drum 1 configured as described above, since the +azimuth reproducing head group +R and the −azimuth reproducing head group −R are spaced at 180° from each other in the circumferential direction, it is possible to take a good rotational balance of the rotary drum 1 and hence to reduce the RRO component of the rotary drum 1. Also, to take a balance against the reproducing heads +W1, −W2, +W3, and −W4 arranged at a location in the circumferential direction in such a manner as to be in proximity to each other, a dummy head or a counter weight may be disposed at a position being 180° opposed to these recording heads +W1, −W2, +W3, and −W4. With this configuration, it is possible to further improve the rotational balance of the rotary drum 1, and hence to further reduce the RRO component of the rotary drum 1.

It is to be noted that the +azimuth reproducing head group +R and the −azimuth reproducing head group −R are spaced at 180° from each other in the circumferential direction according to this embodiment; however, the present invention is not limited thereto but may be configured such that these two azimuth reproducing head groups +R and −R be spaced at a suitable angle from each other in the circumferential direction.

With respect to rotary transformers RTr (see FIG. 3) of a reproducing system to be provided for the rotary drum 1 provided with the eight reproducing heads +R1, −R1, +R2, −R2 . . . , since the +azimuth reproducing head group +R and the −azimuth reproducing head group −R are spaced at 180° from each other in the circumferential direction, it is sufficient for four pieces of the rotary transformers RTr to be provided for the rotary drum 1.

In the case of providing the eight reproducing heads +R1, −R1, +R2, −R2 . . . , it is generally required to provide eight pieces of the rotary transformers RTr of the reproducing system; however, according to this embodiment, since the two reproducing head groups +R and −R are spaced at 180° from each other in the circumferential direction, the rotary transformers RTr can be switched between the two reproducing head groups +R and −R. This means that one rotary transformer RTr can be shared between the two reproducing heads different in azimuth angle.

FIG. 3 is a schematic circuit diagram of the rotary drum 1. Referring to this figure, four rotary transformers RTw, RTw, . . . of a recording system are provided in such a manner as to correspond to the four recording heads +W1, −W2, +W3, and −W4, and four recording amplifiers 2, 2, . . . for amplifying recording signals to be given to the recording heads +W1, −W2, +W3, and −W4 are provided on the stator side.

The eight reproducing heads +R1, −R1, +R2, −R2 are individually connected to eight reproducing amplifiers 3, 3, . . . . These eight reproducing amplifiers 3, 3, . . . are selectively connected to four rotary transformers RTr, RTr, . . . of a reproducing system via four switches 4, 4, . . . .

To be more specific, one rotary transformer RTr is selectively connected to the two reproducing heads different in azimuth angle, for example, the reproducing heads +R1 and −R1 via the switch 4.

With this configuration, since the two reproducing heads +R1 and −R1 different in azimuth angle are spaced at 180° from each other in the circumferential direction of the rotary drum 1, one rotary transformer RTr can be shared between the two reproducing heads +R1 and −R1 by switching the switch 4 in synchronization with the rotational angle 180° of the rotary drum 1. As a result, it is sufficient for the rotary transformers RTr of the number being half the number of the reproducing heads. This contributes to miniaturization of the rotary drum 1.

In the embodiment, the present invention has been described by example of the four channel recording tracks; however, the present invention is not limited thereto but may be applied to six or eight channel recording tracks by increasing the number of the reproducing heads.

Also, in the embodiment, the present invention has been described by example of the rotary drum provided with recording heads; however, the present invention is not limited thereto but may be applied to a rotary drum provided with only reproducing heads.

Other specific shapes and structures of each portion described in the embodiment are only illustrative for carrying out the present invention, and therefore, the technical scope of the present invention should not be construed as limited thereto.

What is claimed is:

1. A rotary drum comprising:
   a plurality of reproducing heads each having a plus azimuth angle which heads are collectively arranged at a location in the circumferential direction of said rotary drum in such a manner as to be in close proximity to each other, to be taken as a plus azimuth reproducing head group; and
   a plurality of reproducing heads each having a minus azimuth angle which heads are collectively arranged at a location in the circumferential direction of said rotary drum in such a manner as to be in close proximity to each other, to be taken as a minus azimuth reproducing head group;
   a plurality of recording heads each having a plus azimuth angle; and
   a plurality of recording heads each having a minus azimuth angle,
   wherein said pluralities of recording heads are arranged at a location in the circumferential direction of said rotary drum in such a manner as to be in close proximity to each other, to be taken as a recording head group, wherein said plus azimuth reproducing head group and said minus azimuth reproducing head group are spaced at about 180° from each other in the circumferential direction of said rotary drum.

2. A rotary drum according to claim 1, further comprising:
   a dummy head or a counter weight for taking balance against said recording head group;
      wherein said dummy head or counter weight is spaced at about 180° from said recording head group in the circumferential direction of said rotary drum.

3. A rotary drum according to claim 1, wherein the number of reproducing heads having a plus azimuth angle is twice the number of recording heads having a plus azimuth angle.

4. A magnetic recording and reproducing apparatus including a rotary drum, said rotary drum comprising:
   a plurality of reproducing heads each having a plus azimuth which heads are collectively arranged at a location in the circumferential direction of said rotary drum in such a manner as to be in close proximity to each other, to be taken as a plus azimuth reproducing head group; and
   a plurality of reproducing heads each having a minus azimuth angle which heads are collectively arranged at a location in the circumferential direction of said rotary drum in such a manner as to be in close proximity to each other, to be taken as a minus azimuth reproducing head group;
   a plurality of recording heads each having a plus azimuth angle; and
   a plurality of recording heads each having a minus azimuth angle,
   wherein said pluralities of recording heads of said rotary drum are arranged at a location in the circumferential direction of said rotary drum in such a manner as to be in close proximity to each other, to be taken as a recording head group, wherein said plus azimuth reproducing head group and said minus azimuth reproducing head group of said rotary drum are spaced at about 180° from each other in the circumferential direction of said rotary drum.

5. A magnetic recording and reproducing apparatus according to claim 4, wherein said rotary drum further comprises:
   a dummy head or a counter weight for taking balance against said recording head group;
      wherein said dummy head or counter weight is spaced at about 180° from said recording head group in the circumferential direction of said rotary drum.

6. A rotary drum according to claim 4, wherein the number of reproducing heads having a plus azimuth angle is twice the number of recording heads having a plus azimuth angle.

* * * * *